United States Patent [19]

Veillard

[11] Patent Number: 4,493,093
[45] Date of Patent: Jan. 8, 1985

[54] ZERO OVERHEAD SYNC IN DATA RECORDING

[75] Inventor: Dominique H. Veillard, San Diego, Calif.

[73] Assignee: Eastman Kodak Company, Rochester, N.Y.

[21] Appl. No.: 440,143

[22] Filed: Nov. 8, 1982

[51] Int. Cl.³ .............................................. H04L 7/02
[52] U.S. Cl. .................................. 375/110; 340/146.2
[58] Field of Search ................ 370/100, 105; 375/106, 375/110, 114, 116; 340/146.2, 825.2; 371/47, 61

[56] References Cited

U.S. PATENT DOCUMENTS

| | | | |
|---|---|---|---|
| 3,546,592 | 12/1970 | Mayo | 375/110 |
| 3,842,399 | 10/1974 | Kneuer et al. | 375/110 |
| 4,091,425 | 5/1978 | Dakin | 360/38 |
| 4,132,975 | 1/1979 | Koike | 340/146.1 BA |
| 4,206,440 | 6/1980 | Doi et al. | 371/39 |
| 4,228,467 | 10/1980 | de Loye et al. | 358/261 |
| 4,247,936 | 1/1981 | Hustig | 375/110 |
| 4,276,544 | 6/1981 | Iinuma | 340/347 DD |
| 4,276,650 | 6/1981 | de Jager et al. | 375/110 |
| 4,279,018 | 7/1981 | Carson | 364/514 |
| 4,296,440 | 10/1981 | Rosenheck | 358/257 |
| 4,328,580 | 5/1982 | Stockham, Jr. et al. | 371/8 |
| 4,347,606 | 8/1982 | Hoogeveen | 370/105 |

Primary Examiner—Benedict V. Safourek
Attorney, Agent, or Firm—Robert F. Cody

[57] ABSTRACT

The concept of the disclosed invention is to discern the start and end of bytes within a bit stream without the provision of special sync-defining bits, utilizing for such purpose the statistical character of the bit stream. Because actual signal processing circuits inherently do not have sharp cutoffs, this means that aliasing-free sampling of an analog signal must be at some sampling rate greater than twice the highest frequency (of interest) within the analog signal. Since the sampling in question is above the theoretically lowest possible sampling frequency, even the highest frequency components within the analog signal so sampled will be sampled at more than twice per cycle; and, attendantly, after the analog signal samples are quantized into a bit stream, a statistical distribution relating to the frequency at which the bits in the bit stream switch their states will become apparent . . . lower significant bits switching between ONEs and ZEROs at rates greater than the switching rates of more significant bits. By monitoring the switching transitions for the bits in a bit stream, the start and end of the bytes thereof may be discerned.

10 Claims, 6 Drawing Figures

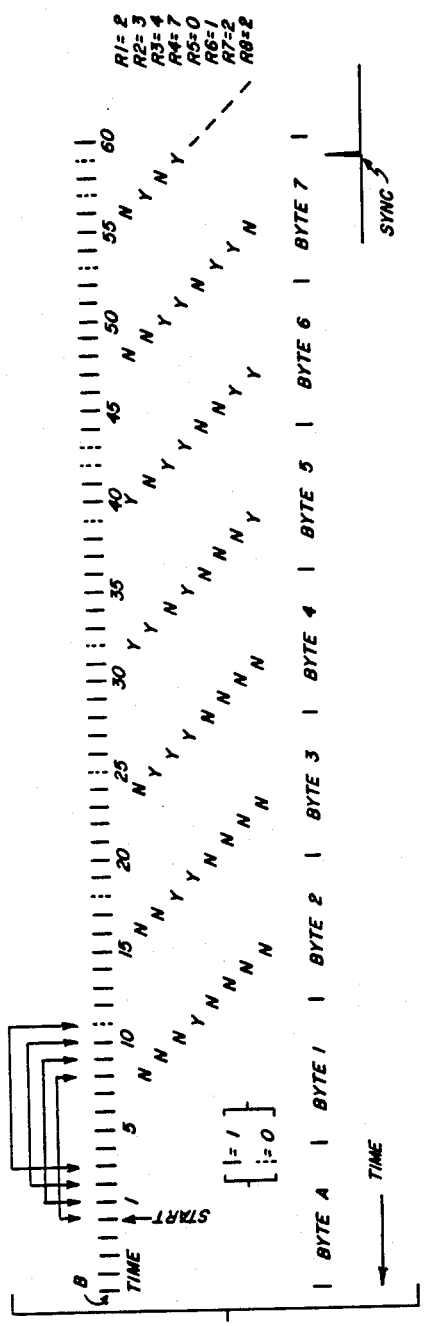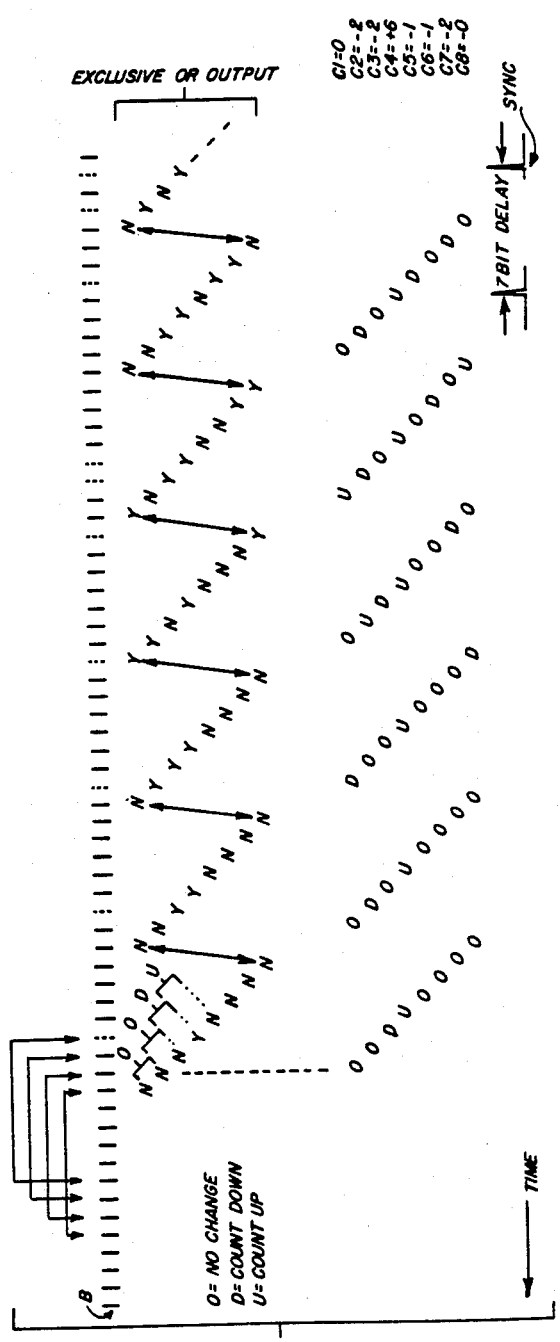

ZERO OVERHEAD SYNC IN DATA RECORDING

BACKGROUND OF THE INVENTION

1. Field of the Invention

This invention relates in general to digital data processing, and more particularly to a technique for obviating bits within a bit stream which are dedicated to the identification of the start and end of the various bytes which are formed by the bits within such bit stream.

2. Description Relative to the Prior Art

A digital data bit stream is (usually) comprised of a succession of bytes, each having the same number of bits per byte. Unless some provision is made to distinguish the start and end of each given byte, apparatus responsive to the bit stream will be unable to discern whether a given bit is a "most significant bit", a "least significant bit", or a bit somewhere between the most and least significant bits. Were, for example, an apparatus responsive to 8 bit bytes to receive—firstly—the fifth most significant bit of a byte, then the fourth most significant bit of that byte, then the third, and so on, it would wind up interpreting five bits from one byte and three bits from the next occurring byte as its 8 bit input . . . and attendantly the apparatus in question would operate incorrectly.

To reconcile this problem, it is the practice in the art to separate each byte of a bit stream from its adjacent bytes by means of a specially coded sequence of bits constituting "sync" for the bit stream. Typically, about ten percent of the bits in a bit stream containing sync bits are dedicated to the definition of sync. Such use of sync-defining bits, aside from requiring circuit apparatus for interleaving, and then de-interleaving, the information bits and the snyc bits, means inefficiency, and an increase in the bandwidth associated with the bit stream; corollarily, given a finite bandwidth for the data processing channel in question, this attendantly means that the capacity of the channel processing the bits is less than it would be otherwise.

SUMMARY OF THE INVENTION

The concept of the invention is to discern the start and end of bytes within a bit stream without the provision of special snyc-defining bits, utilizing for such purpose the statistical character of the bit stream. That the bits of a bit stream may themselves serve to identify the start and end of the bytes of a bit stream is rooted in sampling theory: It is well known (Nyquist) that, in order to avoid aliasing, a complex analog signal must be quantized at at least a sampling rate that is twice the highest frequency of which such signal is comprised. Because actual signal processing circuits inherently do not have sharp cutoffs, this means that aliasing-free sampling of an analog signal must be at some sampling rate greater than twice the highest frequency (of interest) within the analog signal, i.e. at a frequency that is greater than twice the theoretically lowest possible sampling frequency. Since the sampling in question is above the theoretically lowest possible sampling frequency, even the highest frequency components within the analog signal so sampled will be sampled at more than twice per cycle; and, attendantly, after the analog signal samples are quantized into a bit stream, a statistical distribution relating to the frequency at which the bits in the bit stream switch their states will become apparent . . . lower significant bits switching between ONEs and ZEROs at rates greater than the switching rates of more significant bits. (This fact may be appreciated by assuming that the sampling rate has been increased to its limit; clearly, then, the least significant bit will probably change each sample of a changing analog signal, whereas the most significant bit will not.) By monitoring the switching transitions for the bits in a bit stream, the start and end of the bytes thereof may be discerned.

The invention will now be described with reference to the figures of which:

FIG. 3 is a set of diagrams useful in describing the operation of the apparatus of FIG. 2, FIG. 6 is a set of diagrams useful in describing the operation of the apparatus of FIG. 5.

Figure 1:
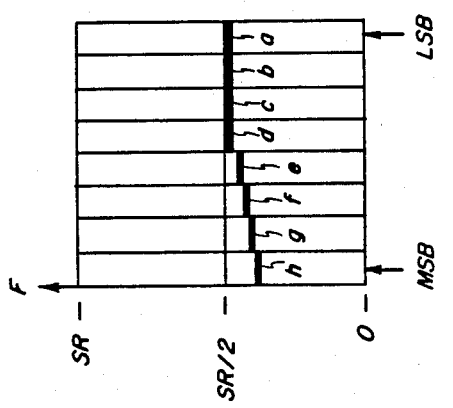
FIG. 1 is a diagram useful in describing one embodiment of the invention.

Referring to FIG. 1, the frequency (F) of occurrence of changes to the bits of a bit stream (8-bit bytes) are plotted, indicating that the most significant bits change at a slower rate than bits of lesser significance . . . the least significant bits changing at a rate that asymptotically approaches the frequency that corresponds to one-half the sampling rate SR. With FIG. 1 in mind, consider the circuit diagram of FIG. 2: As a bit stream is processed via an AND gate 10 to a circuit 12, the corresponding bits of successive bytes are compared with each other, i.e. the most significant bit of byte 1 is compared with the most significant bit of byte 2 . . . the next most significant bit of byte 1 is compared with the next most significant bit of byte 2, and so on. Such comparisons are effected by means of a 1-byte delay device 14 and an Exclusive OR circuit 16. In the event there is a change in the corresponding bits of successive bytes, the Exclusive OR circuit 16 produces an output pulse; if there is no such change, the Exclusive OR circuit does not produce an output pulse. Output pulses from the Exclusive OR circuit 16 are sequentially gated to respective registers in an array thereof, the registers being numbered 1 through 8 to correlate with the eight bits of the bytes processed by the circuit of FIG. 2. It will be appreciated, however, that during operation of the FIG. 2 circuit, byte-to-byte changes which occur, say, to the most significant bit, or to the least significant bit (etc.), may be manifested in the count of any one of the eight registers. Gating of output pulses from the Exclusive OR circuit to the registers 1 through 8 is effected by means of an array of AND gates G1 through G8 which are successively turned ON by a 1-to-8 counter 18, the count of which is decoded by a matrix 20.

Figure 2:
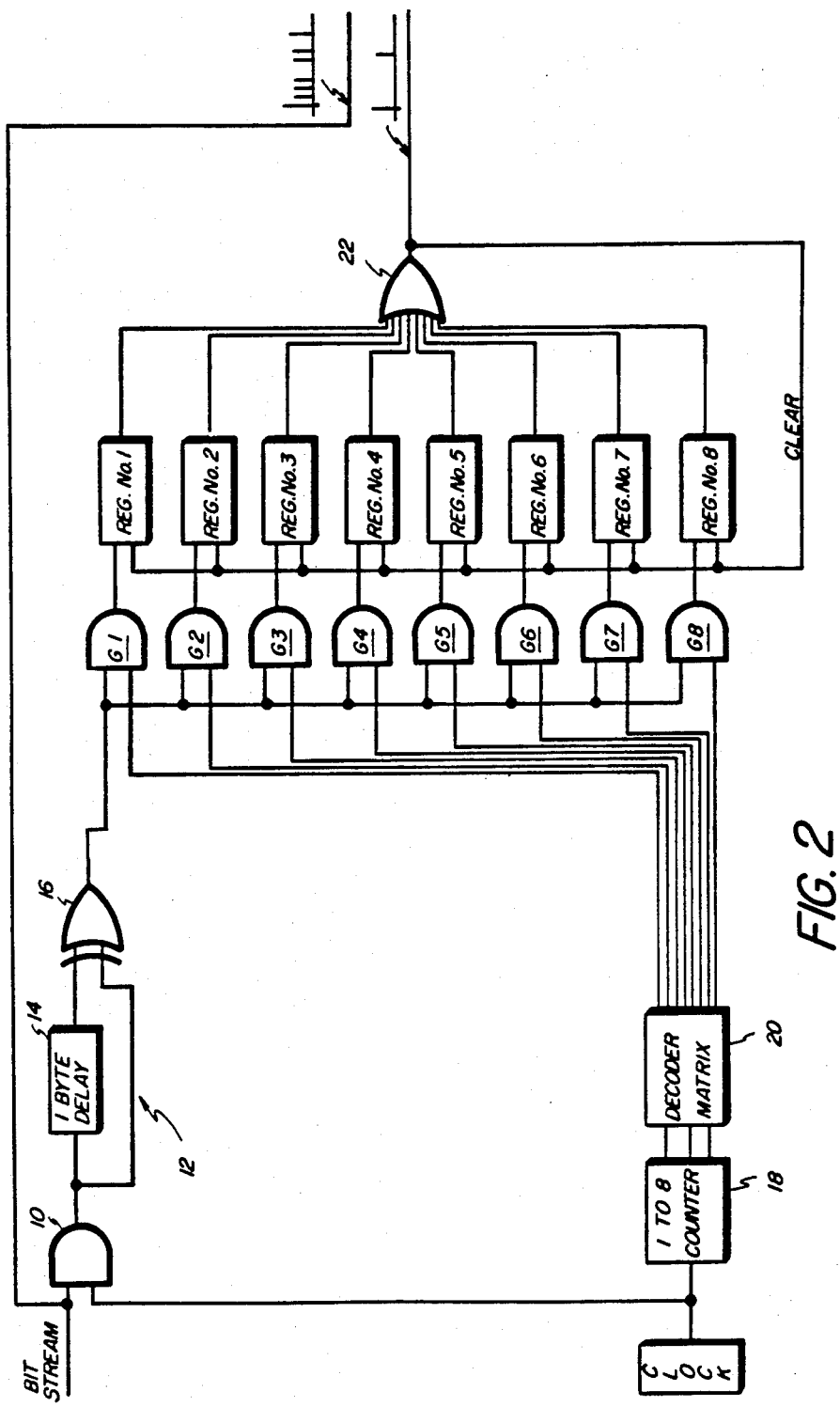
FIG. 2 is a schematic block diagram of one embodiment of the invention.

To see how the circuit of FIG. 2 operates to identify the start and end of bytes in a bit stream that does not include synchronizing data, reference should now be had to the illustrative showing of FIG. 3. Given that an 8-bit-per-byte bit stream B that is devoid of synchronizing data is applied to the AND gate 10 (starting randomly with a bit S of a Byte A), at time $t=8$ the first byte-to-byte comparison of bits is made. At this time the counter 18 has cycled once, causing the AND gate G1 to open; attendantly, if the Exclusive OR circuit 16 were to have a pulse output at this time, such output pulse would get applied to register 1. It will be noted, however, that in the byte-to-byte comparison at time t=8, both compared bits are ONEs; and attendantly, there is "No Output" (N) applied to register 1. Similarly, at times t=9 and t=10, the byte-to-byte comparisons are not productive of Exclusive OR output pulses and attendantly the registers 2 and 3 are not incremented. At time t=11, though, there is a "ONE-to-ZERO" comparison, resulting in a "Yes Output" (Y) that causes the register 4 to increment. As the byte-to-byte comparisons are made, one after the other, the "Yes Outputs" (Y) build up the counts of the registers 1 through 8. Eventually, the count of one of the registers exceeds a predetermined threshold, causing that register to apply a pulse through an OR gate 22 to signify the occurrence of sync. (It will be appreciated that the aforementioned threshold count is identified with a given stage of the registers 1 through 8; this is reflected in the fact that the output leads of the registers 1 through 8 are disposed to the right of each depicted register, "Yes Output" pulses entering to the left of the registers and flowing to the right as viewed in FIG. 2.)

It should be noted that in the simplified showing of FIG. 3, "sync" is indicated as occurring when the register 4 reaches a threshold count of "7". See the sync pulse appearing in FIG. 3, and note that it appears at the occurrence of the least significant bit of Byte 7, thereby identifying where the separation between the least significant bit and the most significant bit of two successive bytes may be found. Of course, in practice, there will be a count far in excess of "7" which will trigger the generation of a sync pulse.

When the sync pulse is produced, it is (additionally) used to clear the registers 1 through 8 so that the whole statistical production of "sync" may be repeated. Such clearing of the registers 1 through 8 when the register 4 reaches its predetermined threshold count means that any "Yes Output" pulses that occur between the times t=60 and t=63 might provide some minor error in the counts of some of those registers which do not reach threshold counts to produce the sync pulse. That is, because the counter 18 is free running, "Yes Output" pulses occurring between times t=60 and t=63 will get (distortionally) accumulated in the registers 5 through 8, causing the counts of those registers to be off by one; but this will present no problem if the threshold count is significant, which is the case in practice. Similarly, because there is no correlation between the bit stream applied to the gate 10 of FIG. 2 and the operation of the 1-to-8 counter 18, the first "Yes Output" pulse through the Exclusive OR circuit 16 might just as easily be applied to a register different than register 4, whereby that register would be the register which would get triggered to produce an output sync pulse when its threshold count was exceeded, albeit at the proper time for sync.

By examining the plot of FIG. 1, it will appear that, as between the frequency of change of any pair of successively more significant bits, there is little difference: the frequency of change of the least significant bit is almost at the sampling rate (SR/2) . . . but so too is the frequency of change of the next least significant bit . . . notwithstanding the fact that the former changes more frequently than the latter. Similarly, the frequency of change to the most significant bit and to the next most significant bit are quite close . . . and so on. This, plus the fact that the bit-wise frequency of change monotonically varies, might—in an unusual situation, and every so often—cause the wrong register to reach a threshold count to identify incorrectly the occurrence of sync. This may be appreciated from FIG. 3 which shows that, as to the counts of the registers 1 through 8, all counts are positive, and "positively" increase; and each count is not too different from its neighboring count. Such being the case, the invention—in its presently preferred form—utilizes to advantage the fact that, although the bit-wise frequency of change varies monotonically as you go from the least significant bit to the most significant bit, the monotonicity disappears as between changes to the least and most significant bits. This may be appreciated (FIG. 1) by successively subtracting, say, the values b from a, c from b, d from c, e from d, f from d, g from f, h from g . . . and a from h. For all but this last subtraction, the difference is near zero, but negative. For the subtraction of a from h, however, the difference goes positive, and is relatively significant. See FIG. 4 which shows this manifestation, and indicates the easy discernability of the "differential" change ($\Delta F$) on a bit-by-bit basis.

Figure 4:
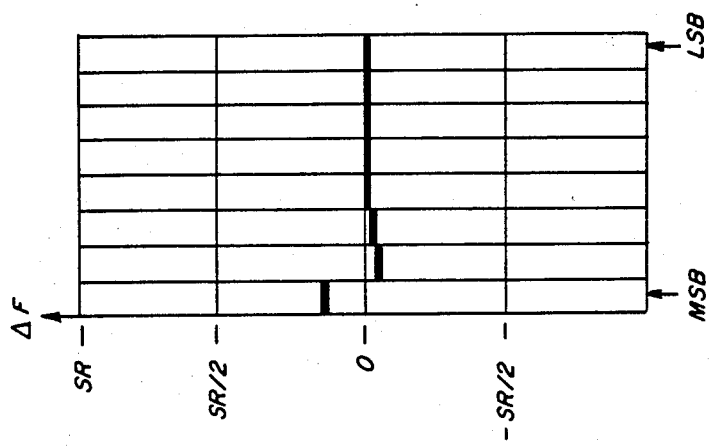
FIG. 4 is a diagram useful in describing a presently preferred form of the invention.
Figure 5:
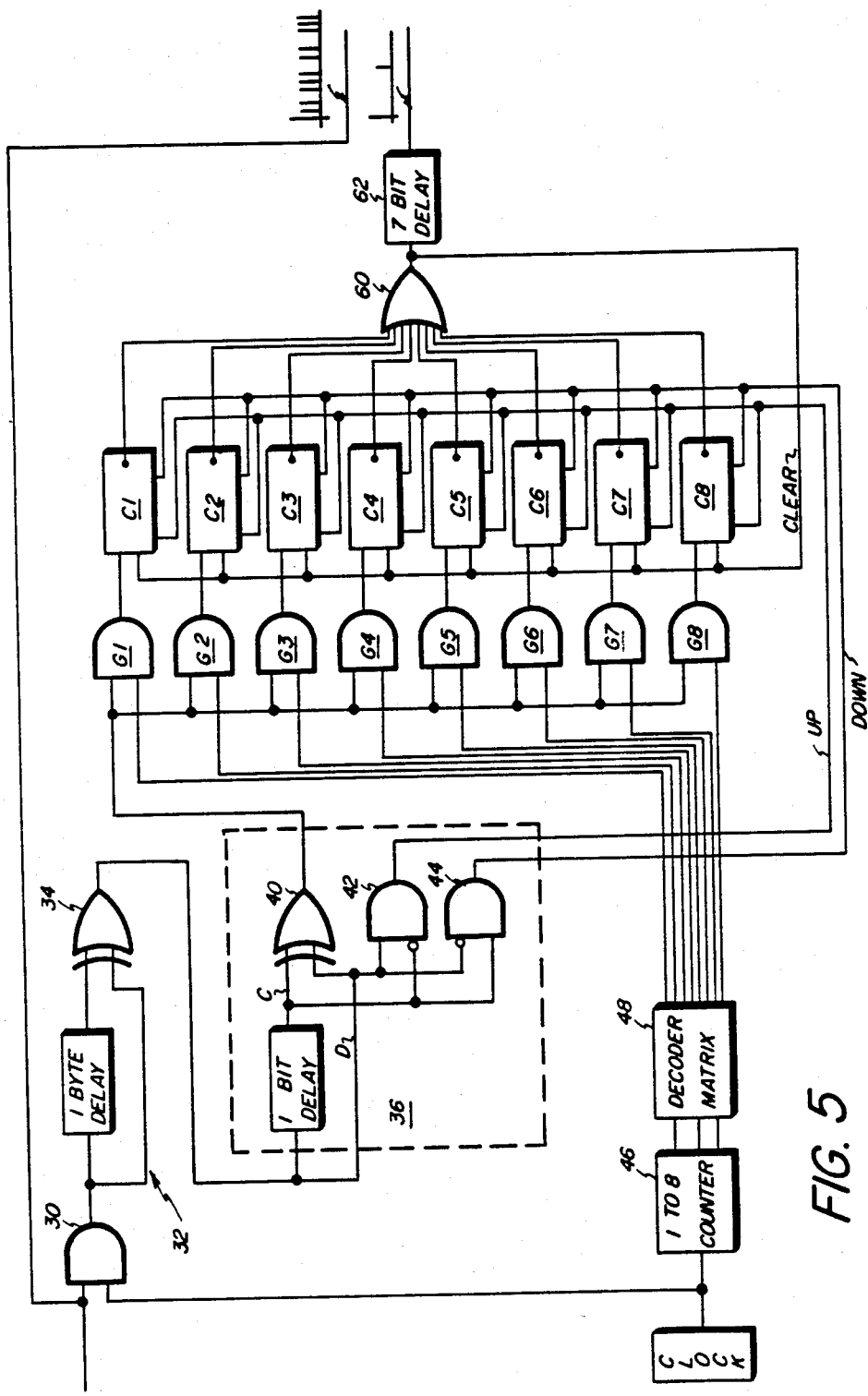
FIG. 5 is a schematic block diagram of a presently preferred form of the invention.

With FIG. 4 in mind, then, reference should next be had to FIG. 5 . . . the apparatus of FIG. 5 implementing a first comparison of like order bits on a byte-by-byte basis, followed by a comparison of the results of such first comparisons on a bit-by-bit basis: As was the case in connection with the apparatus of FIG. 2, the incoming bit stream is clocked through an AND gate 30 to a circuit 32 adapted to compare like order bits from successive bytes. In the event the compared bits are different, an Exclusive OR circuit 34 produces an output pulse to signify a bit change for that order bit. Processing the incoming bit stream in this way has the effect of working according to the curve of FIG. 1. To differentiate the output of the Exclusive OR circuit 34 so as to work, in effect, according to the curve of FIG. 4, the invention calls for the comparison of byte-by-byte bit changes (Exclusive OR circuit 34 output) on a bit-by-bit basis, utilizing to this end a circuit 36. The circuit 36, which comprises a delay device 38, an Exclusive OR circuit 40, and a pair of NAND gates 42, 44, cooperates via a bank of gates g1 through g8 with UP-DOWN counters c1 through c8 . . . the gates g1 through g8 being cyclically operated by a 1-to-8 counter (46)-decoder matrix (48) combination in a manner not unlike the way in which components 18, 20 of FIG. 2 operate.

The circuit 36 of FIG. 5 works as follows: if there is no change, between the byte-to-byte comparisons of corresponding bits, taken on a bit-to-bit basis, i.e. if the signals on leads C & D are either both ONEs or both ZEROs, the Exclusive OR circuit 40 has no output and counting by a selected one of the counters c1 through c8 is not implemented. In the event, however, that there is a bit-to-bit change in such byte-to-byte comparisons, the selected counter will count either UP or DOWN depending on which of the C or D leads carries a ONE. For example, if the bit-to-bit comparison pits a current byte-to-byte change (i.e. the D lead carries a ONE) against a former byte-to-byte non-change (i.e. the C lead carries a ZERO), the selected counter will be made to count UP by operation of the NAND gate 42. By contrast, if the former byte-to-byte comparison had indicated that a bit change had occurred (i.e. the C lead had carried a ONE), and if the current byte-to-byte comparison of corresponding bits had amounted to a non-change between such compared bits (i.e. the D lead had carried a ZERO), the selected counter would have been made to count DOWN by operation of the NAND gate 44. A truth table reflecting this operation is as follows:

| C | D 0 | 1 |
|---|---|---|
| 0 | no change | add one |
| 1 | substract one | no change |

For a further appreciation of the effects of the operation of the circuit 36, consider again the plots of FIGS. 1 & 4. In FIG. 1, obviously the least significant bit changes just a little more often than the second least significant bit; thus, as would be expected, the change in the frequency of change ($\Delta F$) between those bits is almost zero (FIG. 4), with the selected counter counting DOWN just a little more than it counts UP. Similarly, the 3rd least significant bit changes just a little less often than the 2nd least significant bit and, attendantly, the next selected counter will count DOWN just a little more often than it counts UP, whereby its count also approximates ZERO. Each other bit-to-bit comparison between byte-to-byte changes similarly produces a count of about ZERO . . . except for one such comparison, viz. that which concerns the byte-to-byte changes to the most significant bits as compared to the byte-to-byte changes to the least significant bits. In this case, the C lead carries a ONE far more often than the D lead, whereby the count of the selected counter in question will build significantly. When such counter reaches a predetermined threshold count, it applies a pulse, via an OR gate 60, to a 7-bit delay device 62, thereby to signify the occurrence of sync. (The purpose of the 7-bit delay device will be appreciated below in connection with the discussion of FIG. 6.)

Reference should now be had to FIG. 6 which—aside from repeating the "N" & "Y" pattern of FIG. 3, as well as indicating the same "sync-less" bit stream B thereof—indicates the bit-to-bit comparisons, provided by the circuit of FIG. 5, that occur between the N & Y byte-to-byte changes. (It should be kept in mind that FIG. 6, like FIG. 3, is merely representative of circuit operation and that, in practice, many more comparisons than are indicated would occur to indicate the occurrence of sync.) A bit-to-bit comparison between two N's, or between two Y's, signifies no change (a ZERO) to the selected counter of FIG. 5, whereas a N-to-Y comparison signifies that the selected counter should count DOWN (D) by one, and a Y-to-N comparison signifies that the selected counter should count UP (U) by one. With this in mind then, note that after 52 bits (bit time=52), the counter c4 has, in this example, reached a pulse-producing threshold count of +6, whereas all other counters have negative counts or no counts at all. Considering the fact that the bit-to-bit comparisons require a single bit-time to implement, the 7-bit delay 62 provides shifting to the threshold pulse by 7-bit times, thereby to round out the shifting to a full 8-bit times. Attendantly the shifted threshold pulse (sync) correctly coincides timewise, as should be the case, with the occurrence of the sync pulse depicted in FIG. 3; and, as was the case in connection with the apparatus of FIG. 2, the apparatus of FIG. 5 provides sync to an otherwise sync-less bit stream.

The invention has been described in detail with particular reference to preferred embodiments thereof, but it will be understood that variations and modifications can be effected within the spirit and scope of the invention.

I claim:

1. Apparatus adapted to receive a bit stream comprised of a succession of bytes which are each comprised of N bits per byte, there being no synchronizing data between said bytes to signify where one byte begins and another byte ends, said bits occurring at a predetermined bit rate,
    said apparatus being further adapted to identify the start and end of said bytes and being comprised of:
    (a) means for comparing on a byte-by-byte basis like order bits of said bit stream, and for producing a pulse each time any given order bit changes from one byte to the next byte, thereby to produce a succession of pulses,
    (b) N means for accumulating counts in predetermined corresponding with said pulses,
    (c) means for cyclically operating, one after the other, in timed relation to said bit stream, respective means for accumulating counts, and
    (d) means, cooperative with said means for accumulating counts, responsive to a predetermined threshold count in one of said means for accumulating counts, for producing a sync pulse when said threshold count is reached, thereby to signify that the bit occurring at the time of said threshold count corresponds in a certain timed relationship with the start of one byte and the end of another byte.

2. The apparatus of claim 1 wherein all said N means for accumulating counts have a threshold count, and all said threshold counts are the same.

3. The apparatus of claim 1 wherein said means for accumulating counts in correspondence with said pulses is means operative in response to said pulses.

4. The apparatus of claim 1 wherein said means for comparing like order bits and for producing a pulse each time a given order bit changes is comprised of:
    (a) means for receiving said bit stream and for delaying the bits thereof for the duration of one full byte, and
    (b) an Exclusive OR circuit for receiving both the input and output of said means for delaying bits to effect said comparison of bits.

5. The apparatus of claim 1 wherein:
    (a) said means for accumulating counts in correspondence with said pulses is means operative in response to said pulses, and
    (b) said means for comparing like order bits and for producing a pulse each time a given order bit changes is comprised of:
        (1) means for receiving said bit stream and for delaying the bits thereof for the duration of one full byte, and
        (2) an Exclusive OR circuit for receiving both the input and output of said means for delaying bits to effect said comparison of bits.

6. The apparatus of claim 1 including:
    (a) means for comparing, on a bit-by-bit basis, the successive outputs of said means for comparing bit changes which occur on a byte-by-byte basis, thereby to produce:
        (1) no signal when said compared bit changes are the same,
        (2) a first signal when said compared bit changes are of a first sense, and (3) a second signal when said compared bit changes are of a second sense, said first and second signals being applied to said means for accumulating counts to cause respectively said means to increase said counts in response to said first signal and to decrease said counts in response to said second signal.

7. The apparatus of claim 6 wherein:
   (a) said means for comparing like order bits and for producing a pulse each time a given order bit changes is comprised of:
      (1) means for receiving said bit stream and for delaying the bits thereof by one full byte, and
      (2) a first Exclusive OR circuit for receiving both the input and output of said means for delaying bits to effect said comparison of bits, and
   (b) said means for comparing on a bit-by-bit basis the pulses which correspond to said bit changes which occur on a byte-by-byte basis is comprised of:
      (1) means for receiving said successive outputs and for delaying said outputs for a duration corresponding to the duration that occurs between successive bits, and
      (2) a second Exclusive OR circuit for receiving both the input and output of said means for delaying successive outputs to effect said comparison of outputs.

8. A method for detecting the start and end of bytes in a succession thereof in which there are no synchronizing bits between the bytes to identify the start and end of such bytes, all such bytes containing the same number of bits, said method comprising the steps of:
   (a) repeatedly comparing like order bits of each pair of successive bytes to determine whether there is a bit change on a byte-by-byte basis,
   (b) identifying that particular order bit which changes at the highest frequency of change, and
   (c) producing a signal in correspondence with such identification to signify that the identified bit is the least significant bit of a byte and that the next occurring bit is the most significant bit of the next occurring byte.

9. The method of claim 8 wherein the step calling for the identification of the particular order bit which changes at the highest frequency of change comprises the steps of:
   (a) comparing on a bit-by-bit basis the results of the comparison performed on a byte-by-byte basis to determine whether there is a change in such results on a bit-by-bit basis, and
   (b) identifying that bit which corresponds to the greatest accumulated frequency of change in such results.

10. The method of claim 9 wherein:
   (a) the step that calls for bit identification corresponding to the greatest accumulated frequency of change of results includes the steps of:
      (1) adding to the counts of a counter whenever the results of said bit-by-bit comparison has a first sense, and
      (2) subtracting from the counts of said counter whenever the results of said bit-by-bit comparison has a second sense, and
   (b) producing a signal when the count of said counter exceeds a predetermined threshold count, thereby to signify that the bit effecting said threshold count corresponds with the least significant bit of a byte and that the next occurring bit corresponds with the most significant bit of the next occurring byte.

* * * * *